(12) United States Patent
Cole et al.

(10) Patent No.: US 11,397,266 B2
(45) Date of Patent: Jul. 26, 2022

(54) GPS ASSISTED WALKOVER LOCATING SYSTEM AND METHOD

(71) Applicant: SUBSITE, LLC, Perry, OK (US)

(72) Inventors: Scott B. Cole, Edmond, OK (US);
Brian J. Schrock, Fulshear, TX (US);
Klayton Day Jones, Perry, OK (US)

(73) Assignee: SUBSITE, LLC, Perry, OK (US)

( * ) Notice: Subject to any disclaimer, the term of this patent is extended or adjusted under 35 U.S.C. 154(b) by 396 days.

(21) Appl. No.: 16/549,740

(22) Filed: Aug. 23, 2019

(65) Prior Publication Data

US 2020/0072983 A1    Mar. 5, 2020

Related U.S. Application Data

(60) Provisional application No. 62/724,161, filed on Aug. 29, 2018.

(51) Int. Cl.
| | | |
|---|---|---|
| *G01S 19/45* | (2010.01) | |
| *G01V 3/08* | (2006.01) | |
| *G01S 19/48* | (2010.01) | |
| *G01S 19/38* | (2010.01) | |
| *G01S 5/00* | (2006.01) | |
| *G01S 19/42* | (2010.01) | |

(52) U.S. Cl.
CPC ............. *G01S 19/45* (2013.01); *G01S 19/48* (2013.01); *G01V 3/081* (2013.01); *G01S 5/018* (2020.05); *G01S 19/38* (2013.01); *G01S 19/42* (2013.01)

(58) Field of Classification Search
CPC .......... G01S 19/45; G01S 19/38; G01S 19/42; G01S 19/48; G01S 5/018; G01V 3/081

USPC ............. 342/357.28, 357.31, 357.25, 357.21
See application file for complete search history.

(56) References Cited

U.S. PATENT DOCUMENTS

| | | | |
|---|---|---|---|
| 4,390,836 A | 6/1983 | Bruce et al. |
| 4,542,344 A | 9/1985 | Darilek et al. |
| 4,742,356 A | 5/1988 | Kuipers |
| 4,812,812 A | 3/1989 | Flowerdew et al. |
| 5,264,795 A | 11/1993 | Rider |
| 5,397,986 A | 3/1995 | Conway et al. |
| 5,529,437 A | 6/1996 | Filipowski et al. |

(Continued)

FOREIGN PATENT DOCUMENTS

| | | | |
|---|---|---|---|
| DE | 19533105 A1 | 10/1996 |
| EP | 0045486 A3 | 10/1982 |

(Continued)

OTHER PUBLICATIONS

Subsite Electronics, "TK RECON Series Guidance System", Operator's Manual, Jun. 2016, 63 pages, Perry, Oklahoma.

*Primary Examiner* — Chuong P Nguyen
(74) *Attorney, Agent, or Firm* — Tomlinson McKinstry, P.C.

(57) ABSTRACT

A method and system for using GPS signals and a magnetic field to track an underground magnetic field source. A tracker having an antenna for detecting the magnetic field and a GPS receiver is coupled to a processor. The magnetic field is used by the antenna to direct the tracker to a field null point. Once multiple measurements of the field are taken, the changes in signal strength as the absolute position of the tracker is changed, are used to determine whether the closest field null point is in front of or behind the underground beacon. The position and depth of the beacon can then be estimated.

18 Claims, 12 Drawing Sheets

(56) References Cited

U.S. PATENT DOCUMENTS

| | | | |
|---|---|---|---|
| 5,576,973 A * | 11/1996 | Haddy | G01V 3/15 342/357.52 |
| 5,640,092 A | 6/1997 | Motazed et al. | |
| 5,699,048 A | 12/1997 | Galloway | |
| 6,005,532 A | 12/1999 | Ng | |
| 6,035,951 A | 3/2000 | Mercer et al. | |
| 6,250,402 B1 | 6/2001 | Brune et al. | |
| 6,268,731 B1 | 7/2001 | Hopwood et al. | |
| 6,364,035 B2 | 4/2002 | Brune et al. | |
| 6,536,538 B2 | 3/2003 | Brune et al. | |
| 6,563,474 B2 | 5/2003 | Nantz et al. | |
| 6,668,944 B2 | 12/2003 | Brune et al. | |
| 6,737,867 B2 | 5/2004 | Brune et al. | |
| 6,749,029 B2 | 6/2004 | Alft et al. | |
| 6,865,455 B1 | 3/2005 | Wiegert | |
| 6,868,314 B1 | 3/2005 | Frink | |
| 6,882,154 B2 | 4/2005 | Mercer et al. | |
| 6,924,767 B2 | 8/2005 | Kitahara et al. | |
| 7,000,710 B1 | 2/2006 | Umbach | |
| 7,009,399 B2 | 3/2006 | Olsson et al. | |
| 7,013,990 B1 | 3/2006 | Nickel et al. | |
| 7,021,403 B2 | 4/2006 | Brune et al. | |
| 7,042,411 B2 | 5/2006 | Yagi et al. | |
| 7,111,693 B1 | 9/2006 | Self et al. | |
| 7,231,320 B2 | 6/2007 | Papadimitriou et al. | |
| 7,347,280 B2 | 3/2008 | Brune et al. | |
| 7,350,594 B2 | 4/2008 | Cole et al. | |
| 7,356,421 B2 | 4/2008 | Gudmundsson et al. | |
| 7,562,722 B2 | 7/2009 | Brune et al. | |
| 7,647,987 B2 | 1/2010 | Cole | |
| 7,656,159 B2 | 2/2010 | Edelstein | |
| 7,786,731 B2 | 8/2010 | Cole et al. | |
| 7,952,357 B2 | 5/2011 | Cole | |
| 8,018,382 B2 | 9/2011 | Shore et al. | |
| 8,025,109 B2 | 9/2011 | Brune et al. | |
| 8,072,220 B2 | 12/2011 | Dolgin et al. | |
| 8,188,745 B2 * | 5/2012 | Overby | G01V 3/12 342/22 |
| 8,393,414 B2 | 3/2013 | Brune et al. | |
| 8,482,286 B2 | 7/2013 | Cole | |
| 8,497,684 B2 | 7/2013 | Cole et al. | |
| 8,928,323 B2 | 1/2015 | Cole et al. | |
| 9,329,297 B2 * | 5/2016 | Cole | E21B 47/0232 |
| 9,547,101 B2 * | 1/2017 | Cole | G01V 3/26 |
| 10,459,105 B2 * | 10/2019 | Cole | G01V 3/165 |
| 10,822,941 B2 * | 11/2020 | Perteet | E21B 47/024 |
| 11,149,539 B2 * | 10/2021 | Zeller | G01S 19/13 |
| 2002/0020559 A1 | 2/2002 | Barbera et al. | |
| 2002/0116129 A1 | 8/2002 | Alft et al. | |
| 2004/0070399 A1 | 4/2004 | Olsson et al. | |
| 2004/0190374 A1 | 9/2004 | Alft et al. | |
| 2006/0036376 A1 * | 2/2006 | Gudmundsson | G01V 3/081 702/38 |
| 2006/0055584 A1 * | 3/2006 | Waite | G01V 11/00 342/55 |
| 2007/0044536 A1 | 3/2007 | Gunsaulis et al. | |
| 2009/0153141 A1 | 6/2009 | Mercer | |
| 2010/0001731 A1 | 1/2010 | Royle et al. | |
| 2010/0002938 A1 | 1/2010 | Mulcahey | |
| 2011/0227575 A1 | 9/2011 | Cole | |
| 2012/0146648 A1 | 6/2012 | Eick et al. | |
| 2013/0153299 A1 | 6/2013 | Brune et al. | |
| 2013/0175092 A1 | 7/2013 | Kolpak et al. | |
| 2014/0111211 A1 | 4/2014 | Cole et al. | |
| 2014/0163775 A1 | 6/2014 | Metzler | |
| 2014/0222248 A1 | 8/2014 | Levien et al. | |
| 2014/0303814 A1 | 10/2014 | Burema et al. | |
| 2015/0090496 A1 | 4/2015 | Rempe et al. | |
| 2015/0149000 A1 | 5/2015 | Rischmuller et al. | |
| 2016/0018551 A1 | 1/2016 | Cole et al. | |
| 2016/0356146 A1 | 12/2016 | Gard et al. | |
| 2017/0226805 A1 | 8/2017 | Cole | |
| 2017/0299755 A1 | 10/2017 | Cole et al. | |
| 2018/0299575 A1 * | 10/2018 | Cole | E21B 7/04 |
| 2019/0004203 A1 * | 1/2019 | Olsson | G01V 3/15 |
| 2021/0131615 A1 * | 5/2021 | Bailey | B62D 6/001 |

FOREIGN PATENT DOCUMENTS

| | | |
|---|---|---|
| EP | 1526606 A1 | 4/2005 |
| GB | 2006438 A | 5/1979 |
| JP | 2021288 A | 7/1988 |
| JP | 2003249816 A1 | 9/2003 |
| WO | 9530913 | 11/1995 |
| WO | 0010456 | 3/2000 |
| WO | 2006124520 A3 | 11/2006 |

* cited by examiner

GPS ASSISTED WALKOVER LOCATING SYSTEM AND METHOD

SUMMARY

The invention is directed to an above-ground tracking system. The system comprises a portable frame, a triaxial antenna, a global positioning system receiver, a processor, and a memory. The triaxial antenna is by the frame and responsive to a magnetic dipole field. The GPS receiver is supported by the frame. The processor is coupled to the antenna and receiver. The memory is coupled to the processor and has program instructions stored therein. The instructions, when executed by the processor, perform steps. In response to a first and single user request, a first set of measurements are obtained.

The measurements comprise a location measurement from the global positioning receiver and a magnetic field measurement from the receiving antenna. In response to a second, subsequent and single user request, a second set of measurements is obtained. The second set of measurements comprise a location measurement from the global positioning receiver and a magnetic field measurement from the receiving antenna. Thereafter, an estimated position of the source of the dipole field is determined using the first and second sets of measurements.

In another aspect, the invention is directed to a method of observing an underground dipole field source at a first underground location. The dipole field source has a magnetic field arranged in a radiation pattern.

At an above ground location, the magnetic field is measured with a receiving antenna. A set of geographical coordinates are obtained for the first above-ground location using a GPS receiver. Thereafter, the receiving antenna and GPS receiver are moved to a second above-ground location. Thereafter, the magnetic field is measured at the second above-ground location using the receiving antenna. A set of geographical coordinates are obtained for the second above-ground location using the GPS receiver. Thereafter, the underground source of the magnetic field is estimated using the two magnetic field measurements and the two sets of graphical coordinates.

DETAILED DESCRIPTION

Figure 1:
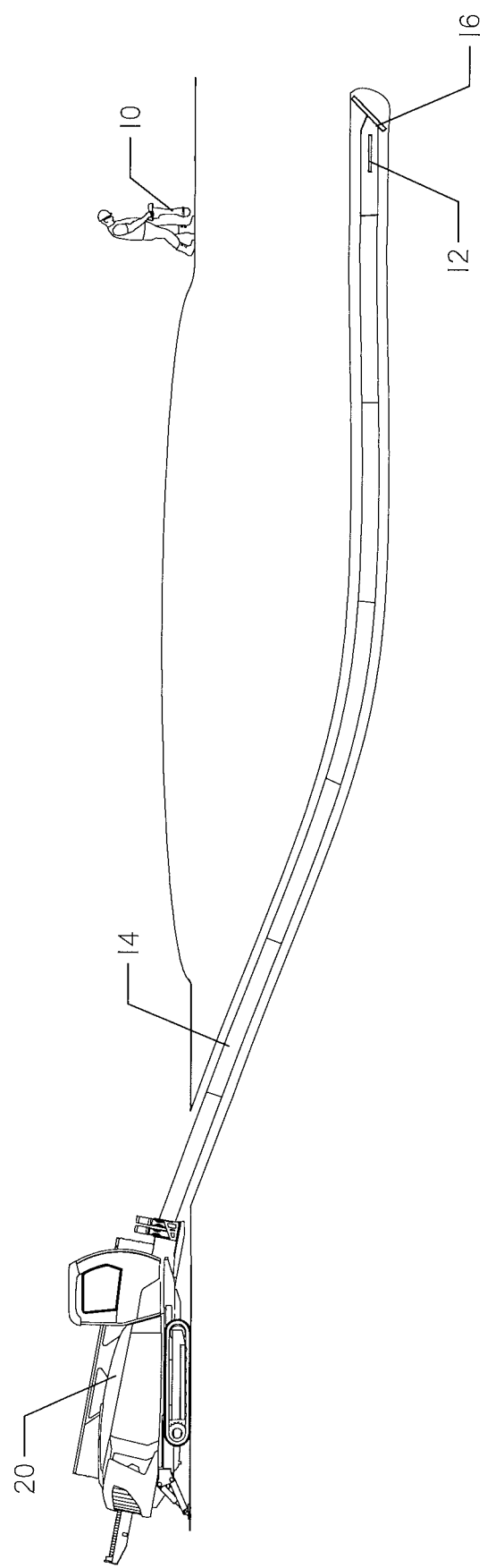
FIG. 1 is a diagrammatic representation of a horizontal drilling operation using an underground beacon and an above ground tracker.

Turning now to the figures, FIG. 1 shows a horizontal directional drilling machine 20 which is driving a drill string 14 in an underground environment. The drill string 14 supports a bit 16 at its distal end. The bit 16 is disposed just in front of a beacon 12. The beacon 12 emits a dipole magnetic field 21 into the underground environment which is detectable at an above ground location. A tracker 10 is used to determine the location of the beacon 12. An exemplar tracker 10 is disclosed and discussed in U.S. Pat. No. 7,647,987, issued to Cole, the contents of which are incorporated herein by reference.

Conventional trackers may utilize global positioning system (GPS) technology to aid in mapping an underground path of the beacon 12. This map usually corresponds to a bore path and an underground utility to be installed along the bore path. A system for incorporating GPS data into bore path mapping and planning is shown in U.S. Patent Pub. No. 2017/0226805, Cole, the contents of which are incorporated herein by reference.

While GPS receivers have been used on trackers for other purposes, in the present invention, the GPS data is used in aiding the tracker 10 to locate the beacon 12. As shown in FIGS. 2-3, the magnetic field emitted by the beacon 12 has a null point 22. In particular, the magnetic field has a front null 22a disposed in front of the bit 16 (FIG. 1) and beacon 12, and a rear null 22b disposed between the beacon and the drilling machine 20. The null point 22 is important, as it may be used to isolate field geometry and achieve precise depth and location readings.

Figure 5:
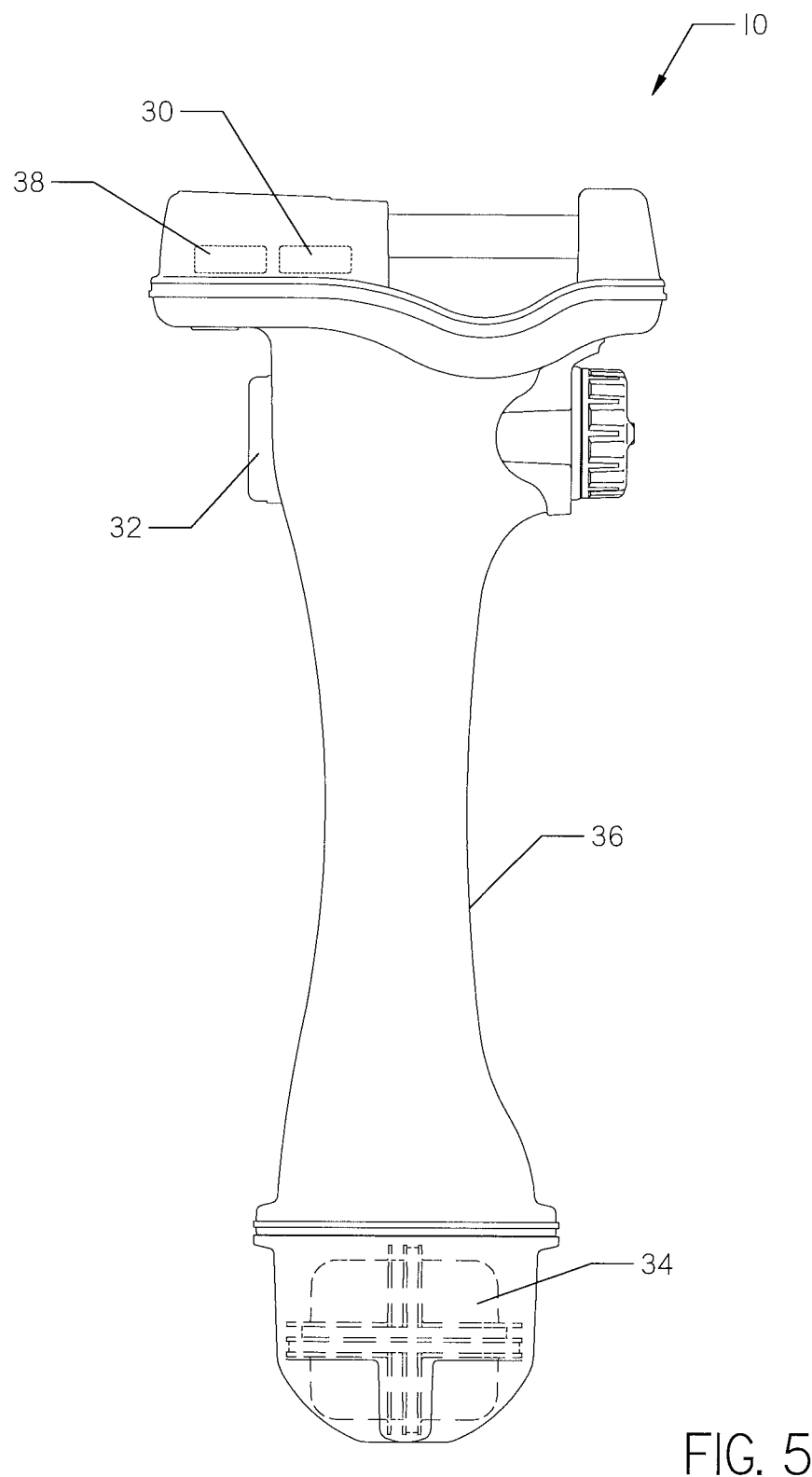
FIG. 5 is a side view of a tracker apparatus with a triaxial antenna, processor, and orientation sensor located within the case and represented with dashed lines.

Components of the tracker 10 are shown in FIG. 5. The tracker 10 comprises an orientation sensor 30, a GPS receiver 32, and an antenna 34, each supported on the same frame 36. The orientation sensor 30 comprises a compass to determine the angle of the tracker relative to magnetic north. The orientation sensor 30 may further comprise an accelerometer, gyro, and other instruments for determining a tilt of the tracker 10 frame 36 relative to vertical.

The GPS receiver 32 is configured to receive signals from a global positioning system 40. The global positioning system 40 is represented in FIGS. 2A-2B, 3A-3B by a satellite. It should be understood that the global positioning system 40 maintained by the United States government provides geolocation and time information to receivers having line-of-sight with the system 40. Typically, line-of-sight with four or more satellites is optimal. The GPS receiver 32 preferably is accurate to 30 centimeters or less. In ideal conditions, accuracy of four centimeters or less is possible.

Figure 6A:
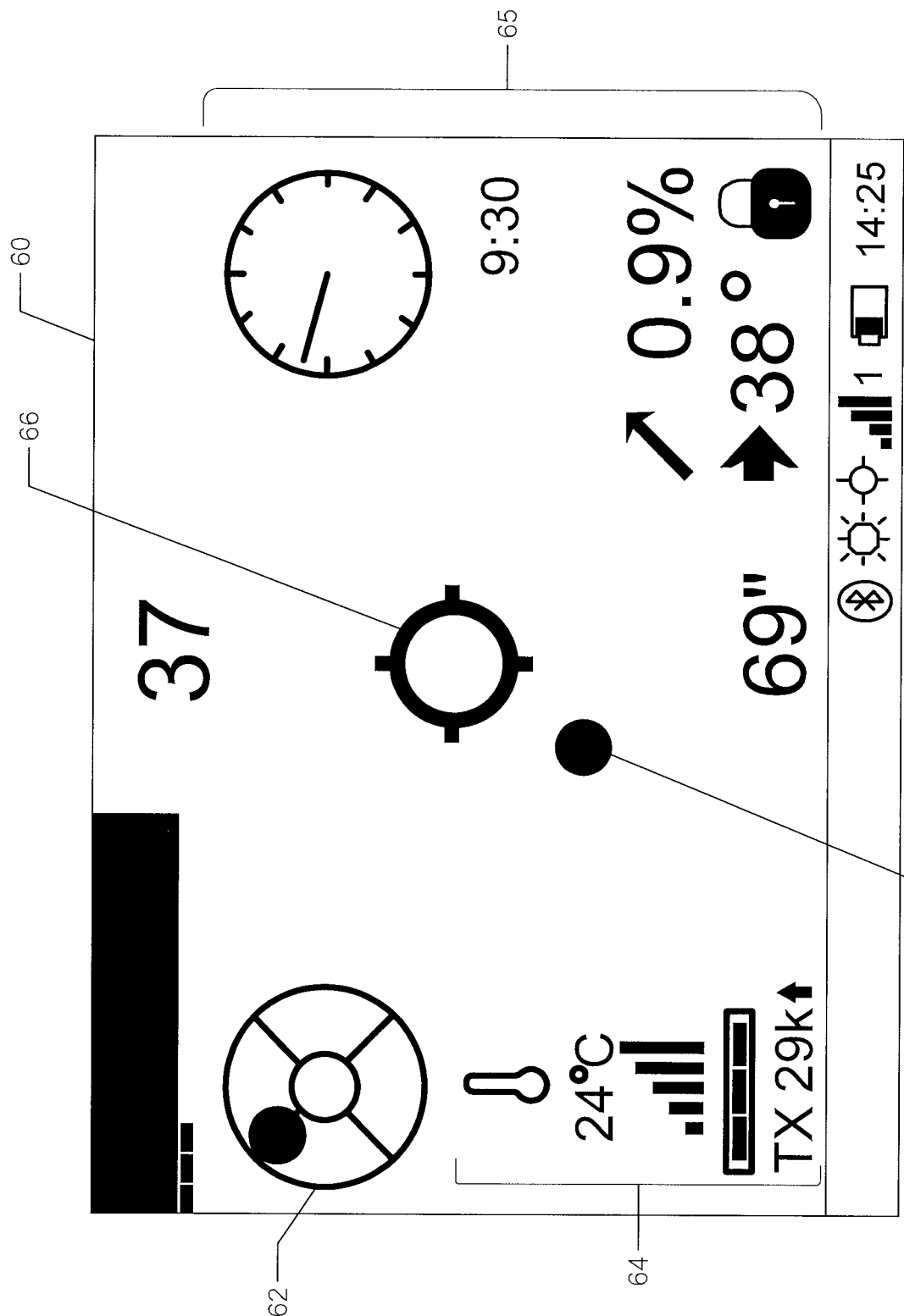
FIG. 6A is a display for use with the tracker, representative of the tracker at the first position.
Figure 6B:
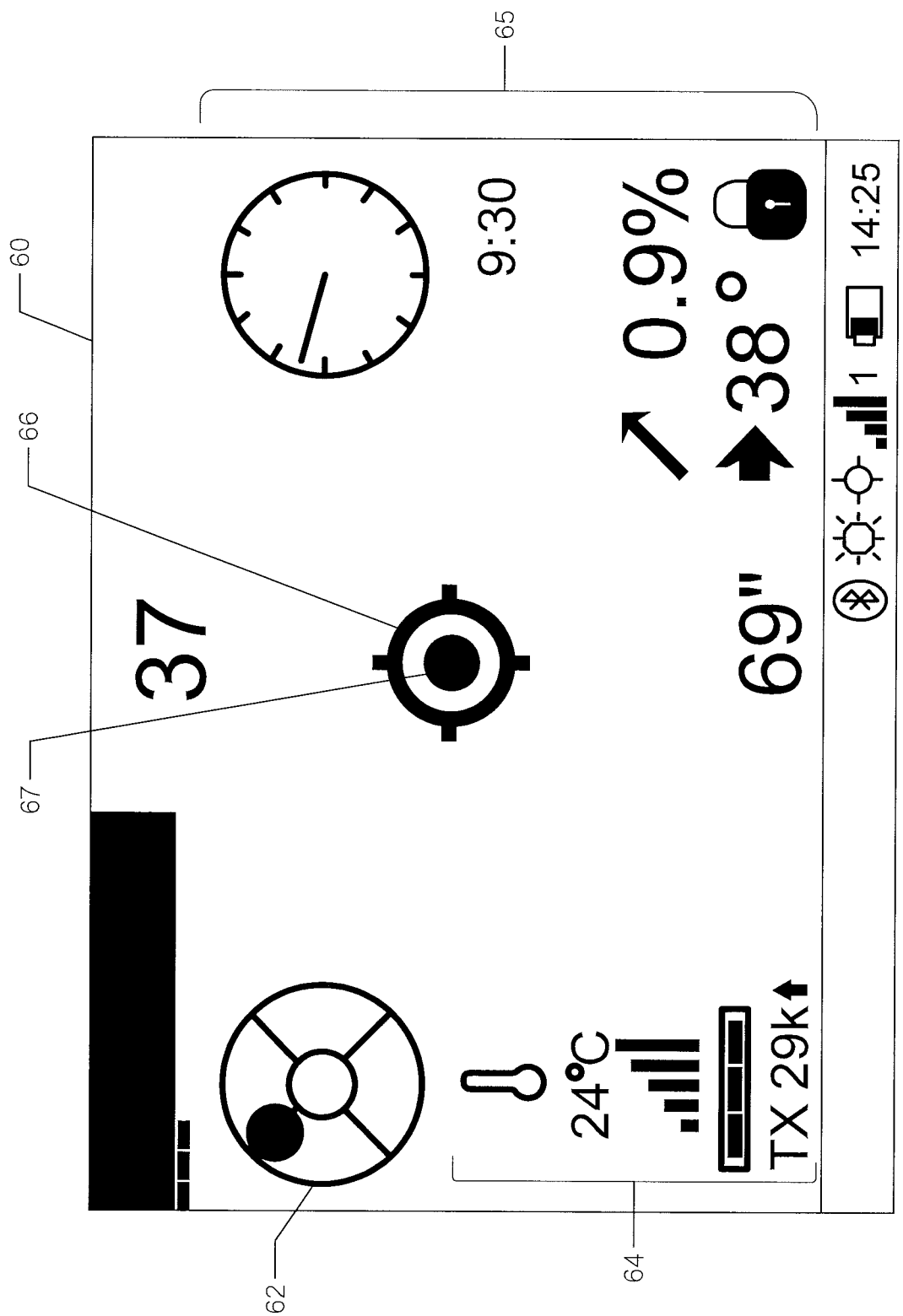
FIG. 6B is a display for use with the tracker, representative of the tracker at the second position prior to determining the position of the detected null relative to the beacon.
Figure 6C:
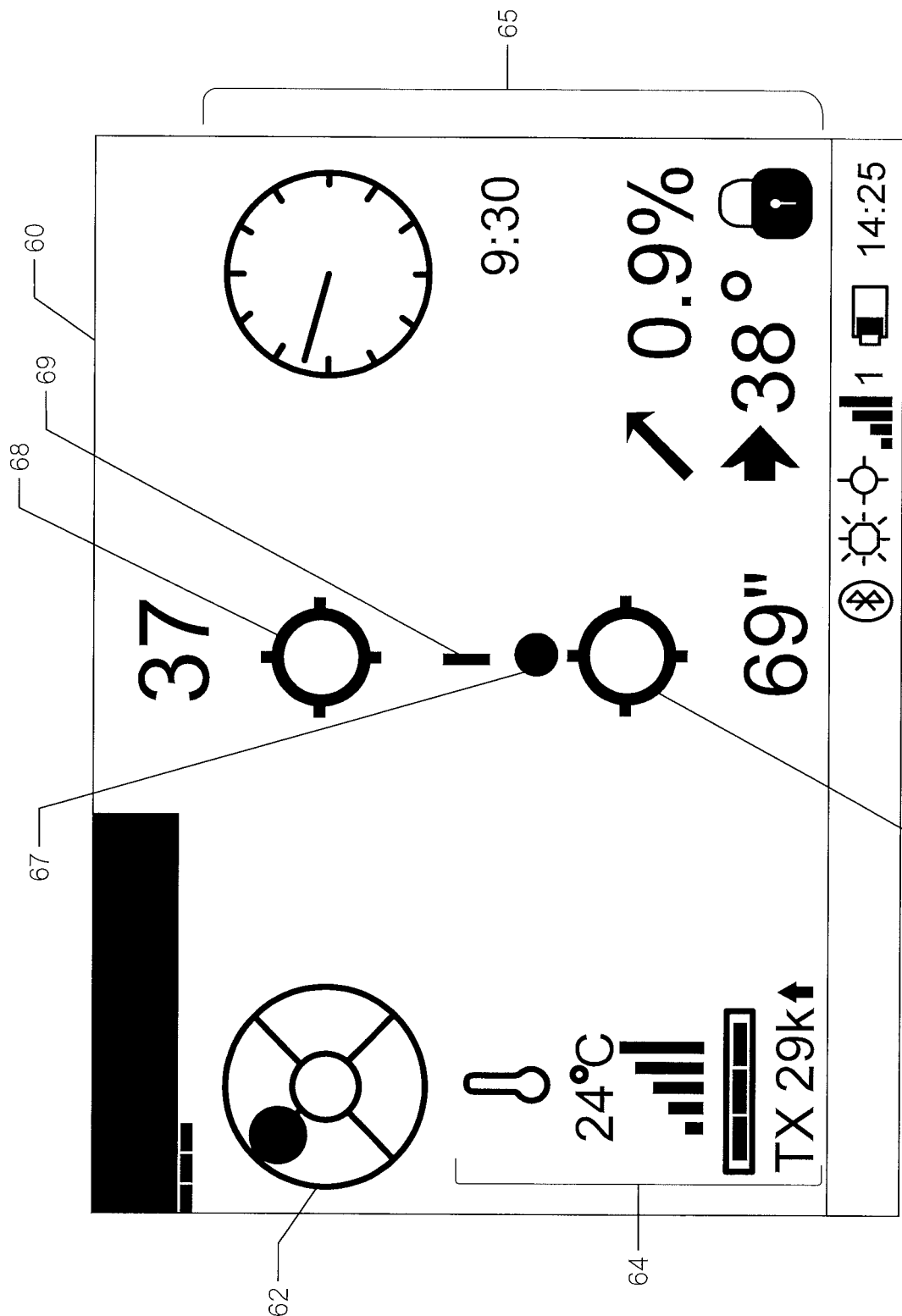
FIG. 6C is a display for use with the tracker, representative of the tracker after determining the position of the two null points relative to the beacon.

A processor 38 in communication with the antenna 34, GPS receiver 32, and orientation sensor 30 may be provided on the frame 36. The processor 38 may receive signals from each of these components, and make determinations regarding the shape of the magnetic field emitted by the beacon 12 based on the signals. Alternatively, the processor 38 may be located remotely from the frame 36. As shown, the processor 38 may cause information to be displayed on a display 60 (FIGS. 6A-6C). The processor 38 may also include a memory for storing information related to the signals received.

Figure 4:
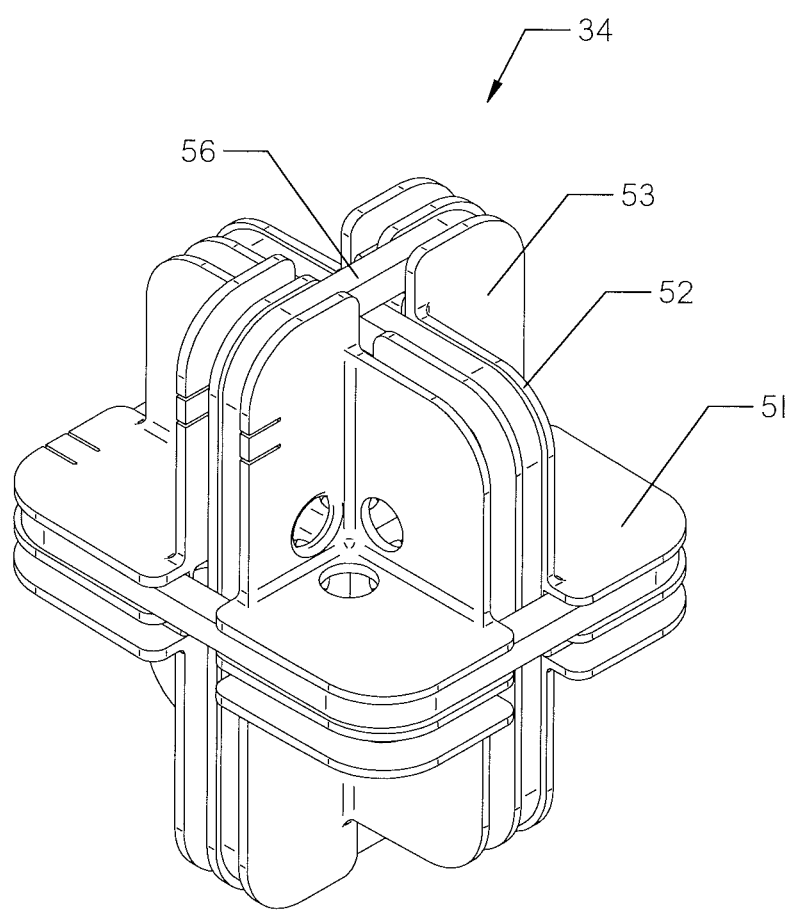
FIG. 4 is a perspective view of a triaxial antenna for use with a tracker.

With reference to FIGS. 4-5 the antenna 34 is supported at a lower end of the frame 36. The antenna 34 comprises three components 51, 52, 53 oriented about orthogonal axes. Each component 51, 52, 53 support one or more windings 56 set about the perimeter of the associated component. Each antenna component 51, 52, 53 preferably has the same center point and equivalent area, with dual, paired windings wound in the opposite direction, as set forth in U.S. Pat. No. 8,928,323, Issued to Cole, the contents of which are incorporated herein by reference. Windings 56 may be litz wire, solid magnet wire, or other antenna wire known in the art. Similar antenna 34 designs with single windings 56 may also be used.

Figure 2A:
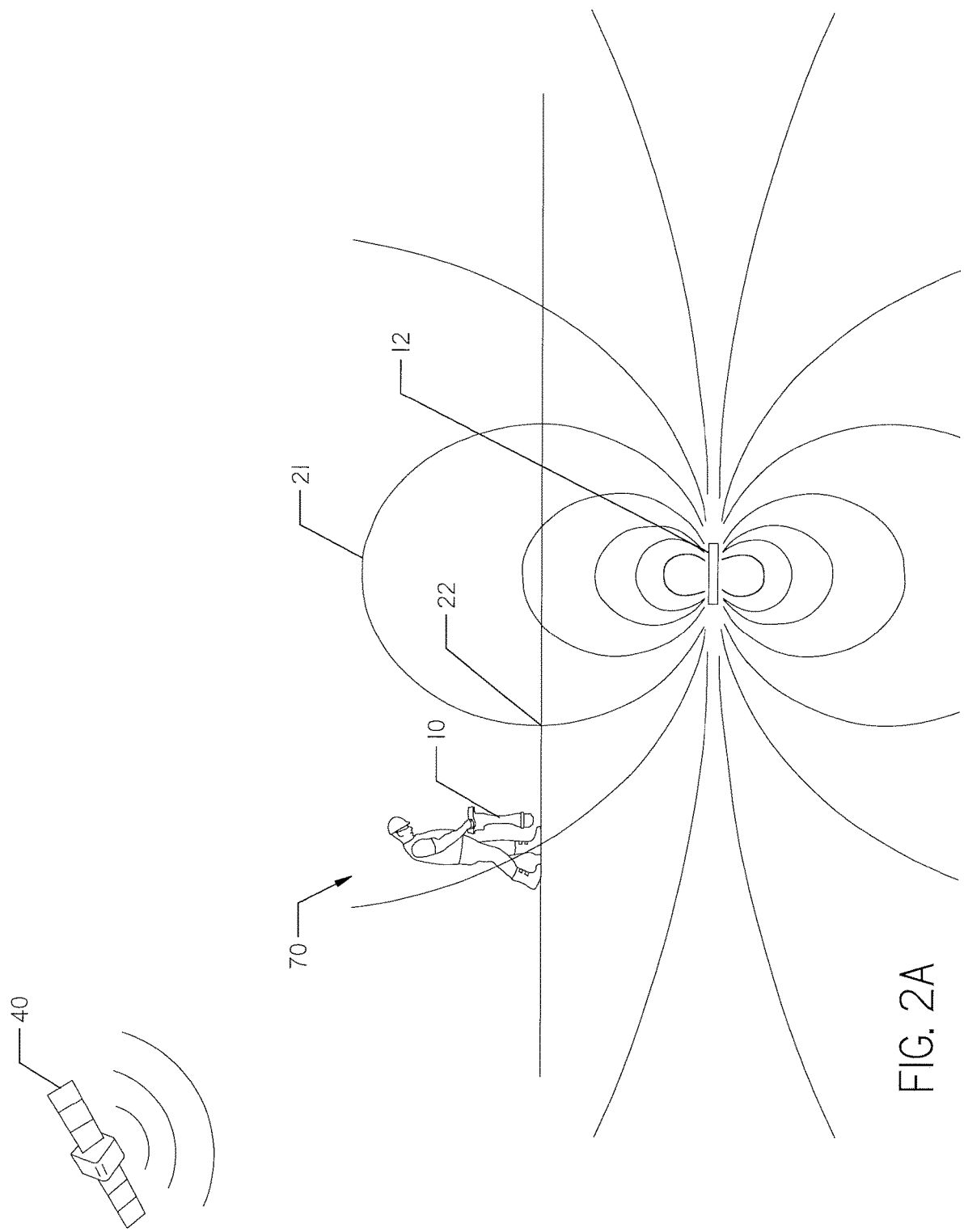
FIG. 2A is a side view of a tracker being used in conjunction with a below ground magnetic field source and a GPS signal at a first location.
Figure 2B:
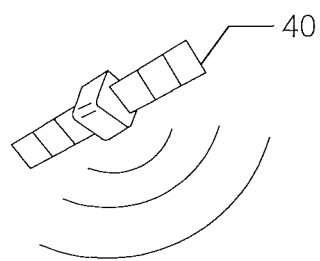
FIG. 2B is a back view of a tracker used in conjunction with a below ground magnetic field source and a GPS signal at the first location.
Figure 2B:
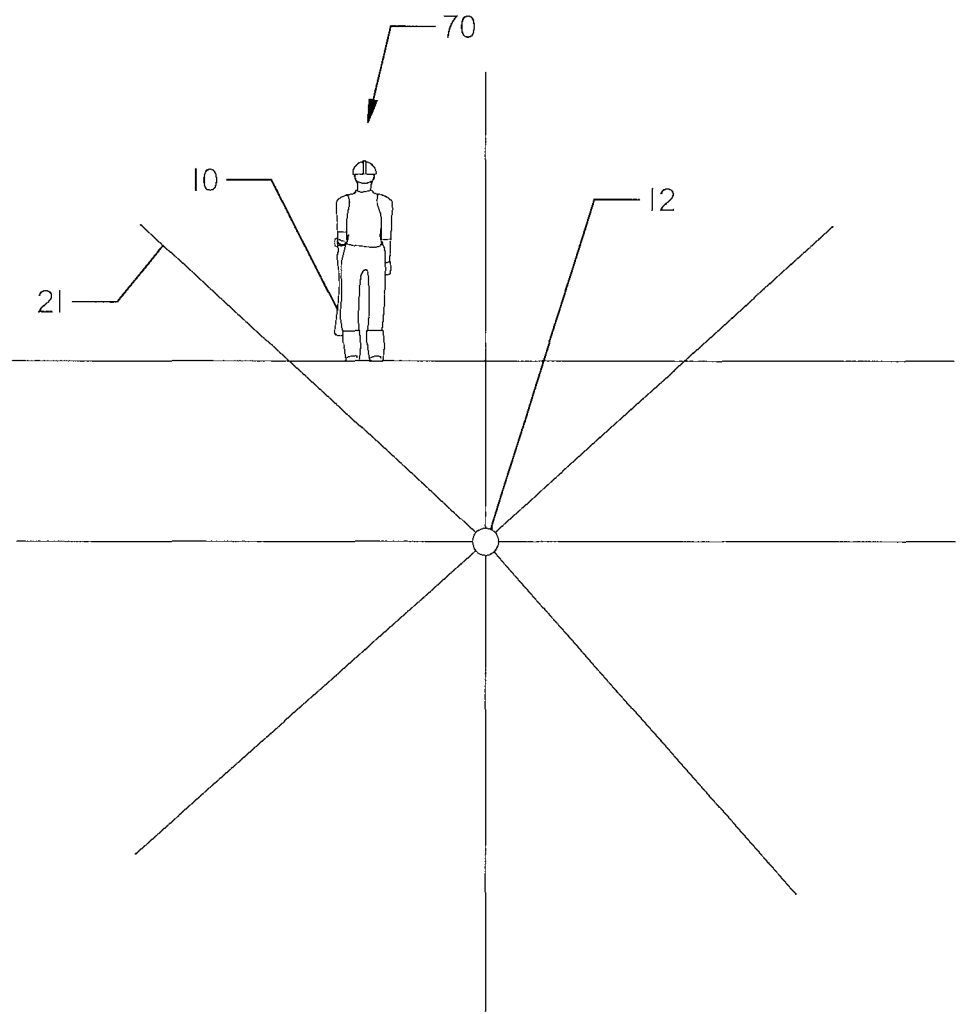
Figure 2C:
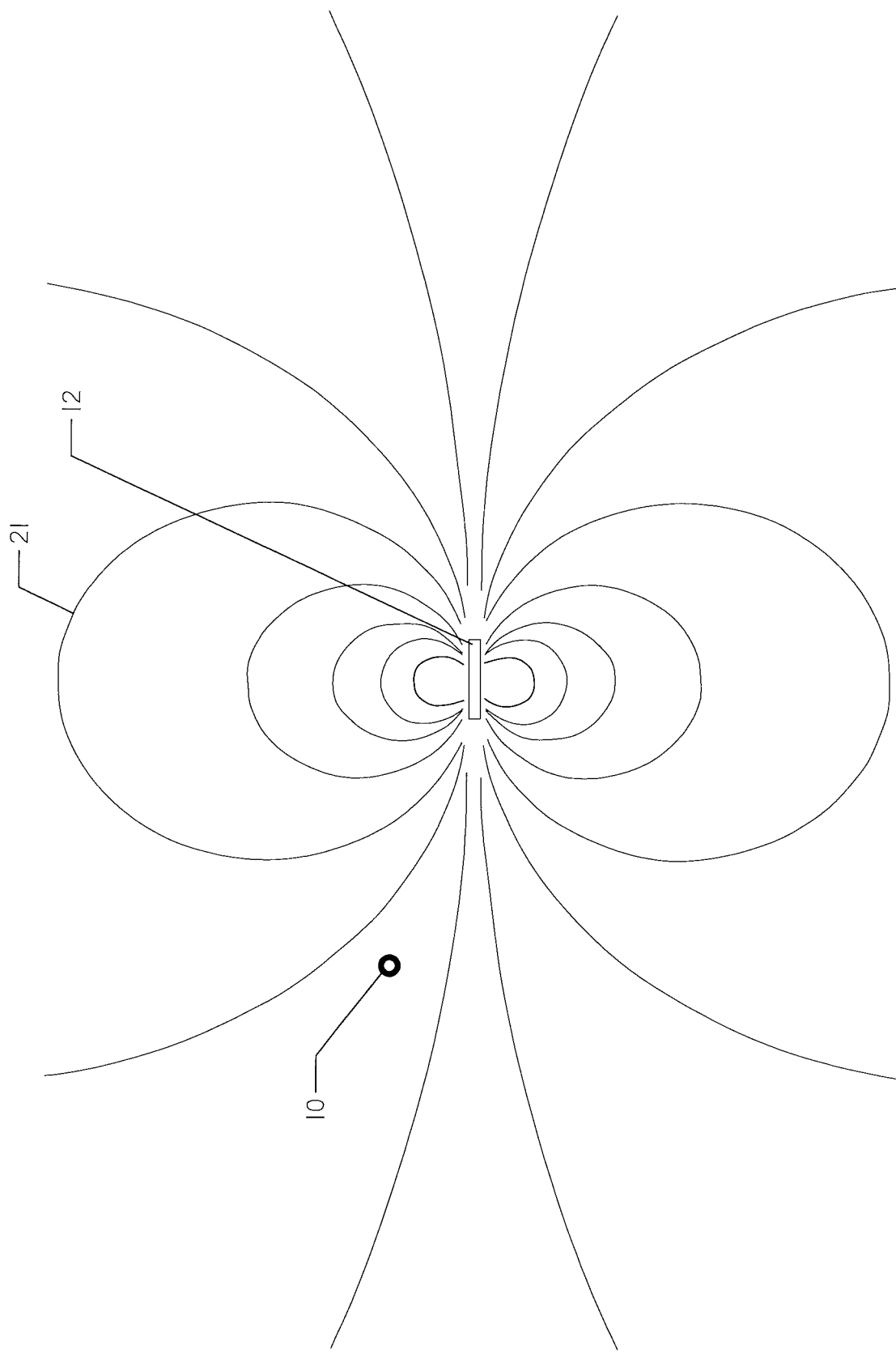
FIG. 2C is a top view of a tracker being used in conjunction with a below ground magnetic field source and a GPS signal at the first location. The ground surface is transparent so that the tracker location and beacon location can be displayed.
Figure 3A:
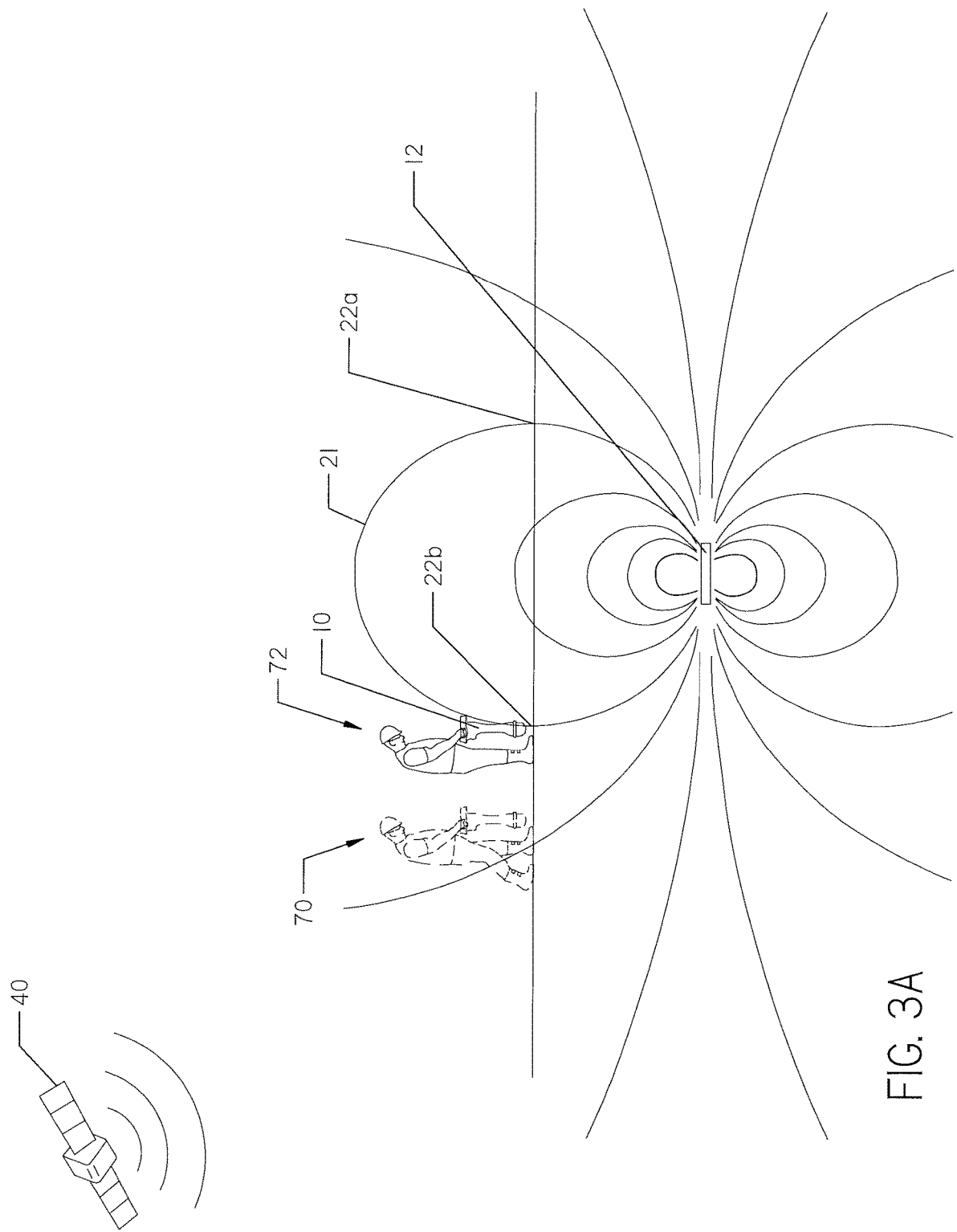
FIG. 3A is a side view of a tracker being used in conjunction with a below ground magnetic field source and a GPS signal at a second location. The first location as represented in FIG. 2A is shown in dashed line.
Figure 3B:
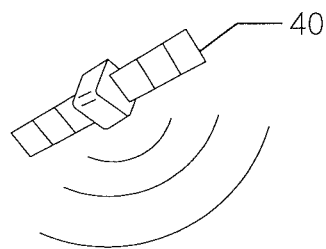
FIG. 3B is a back view of a tracker used in conjunction with a below ground magnetic field source and a GPS signal at the second location. The first location as represented in FIG. 2B is shown in dashed line.
Figure 3B:
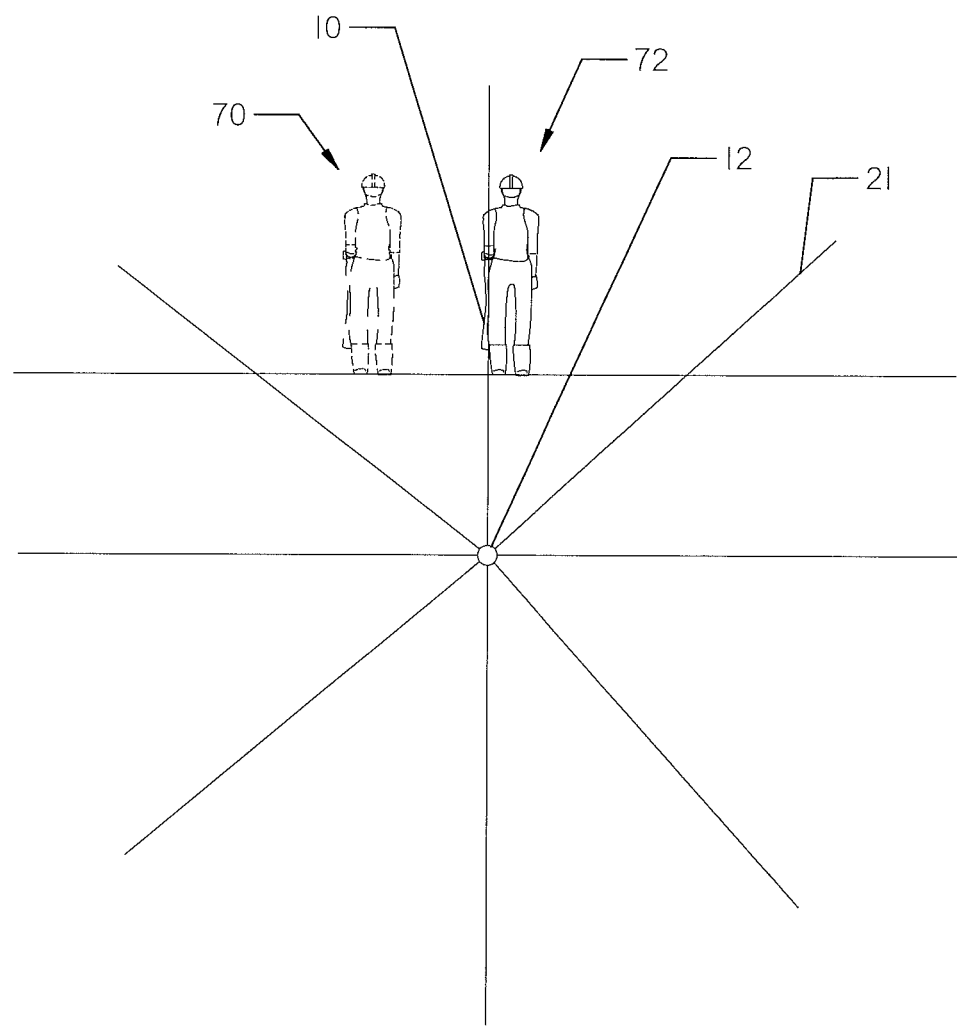
Figure 3C:
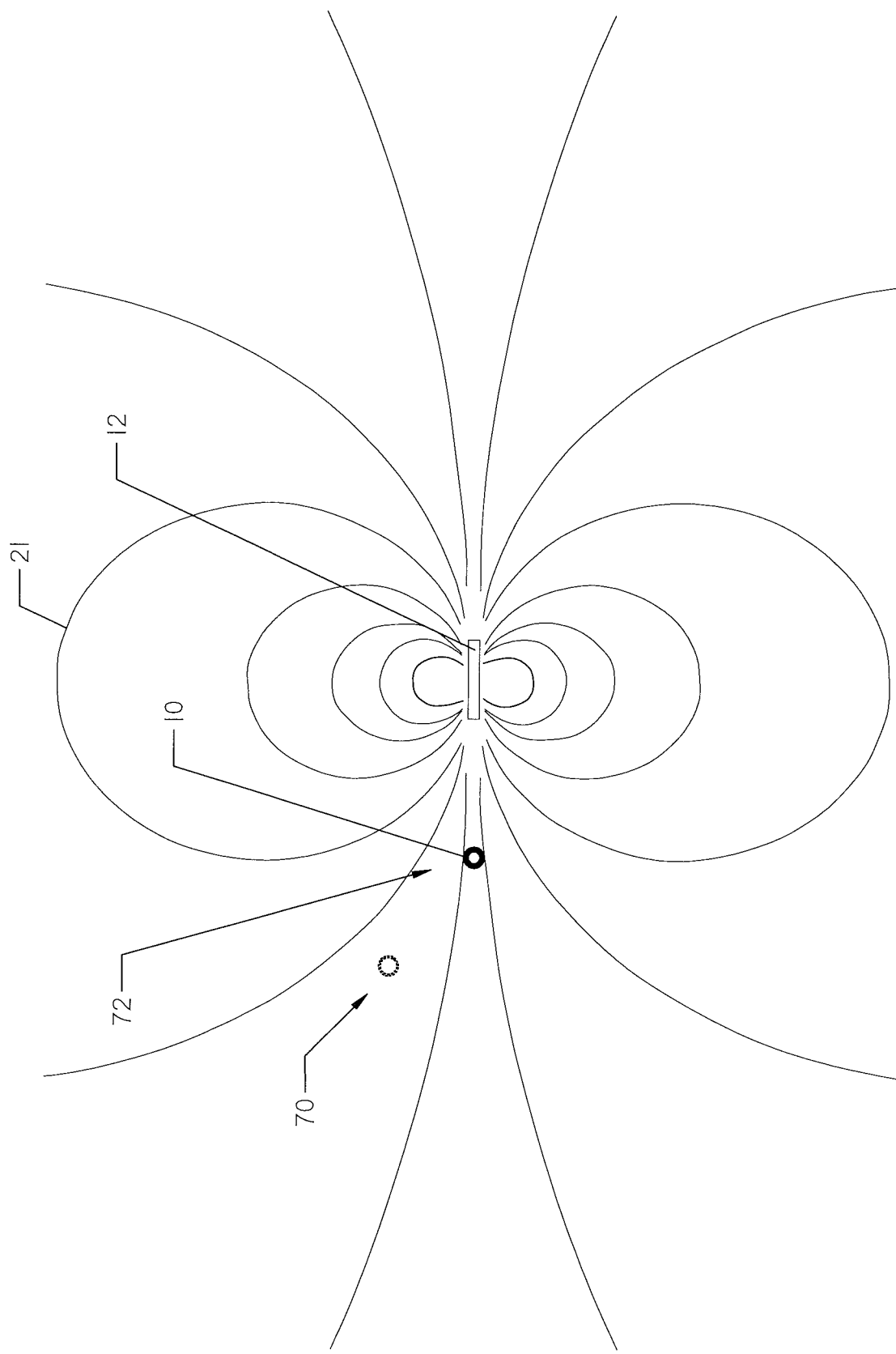
FIG. 3C is a top view of a tracker being used in conjunction with a below ground magnetic field source and a GPS signal at the second location. The ground surface is transparent so that the tracker location and beacon location can be displayed. The first location as represented in FIG. 2C is shown in dashed line.

With reference to FIGS. 2A-3C, a procedure for determining field characteristics is shown. FIGS. 2A-2C show a first measurement taken at the tracker 10 of the magnetic field 21 emitted by beacon 12. FIGS. 3A-3C show a second measurement taken at the field null point 22, with the previous measurement's location shown in dashed lines. FIGS. 2A and 3A are shown from the side of the beacon 12, FIGS. 2B and 3B are shown from directly behind the beacon, and FIGS. 2C and 3C are shown from above, with the ground surface being transparent so that the tracker 10 location and beacon 12 can both be shown.

With the tracker 10 within the magnetic field at the first location 70 shown in FIGS. 2A-2C, the antenna 34 detects vector components of the magnetic field 21. This information allows the processor 38 to determine potential above-ground locations of the first location 70 relative to the underground beacon 12 emitting the field 21. The information also uses the vector angles detected at each component 51, 52, 53 of the antenna 34 to estimate a direction to the closest null point 22. It should be understood that the relative detected vectors at one location cannot determine the absolute location of the beacon 12 or identification of the null point 22, as the magnetic field 21 may have more than one location exhibiting a particular set of characteristics.

The first measurement is taken, providing the onboard processor of the tracker 10 with information about signal strength in the x, y, and z plane based on detection by the tri-axial antenna 34. Additionally, the absolute location of the antenna 34 as detected by the GPS receiver 32 is recorded. This location indicates the position of the tracker 10 to an acceptable rate of error. Simultaneously, the orientation sensor 30 sends a signal indicative of the heading and tilt, if any, of the tracker 10 frame 36. Thus, corrections to the detected field due to frame 36 orientation may be considered.

As shown in FIGS. 3A-3C, the tracker 10 is then moved to a second location 72. As shown, the second location 72 is a null point 22, but the discussion herein is similar if the second location 72 is not a null.

Without advancing the drill string 14, the tracker 10 may be moved to a second location, and a second measurement taken. The second measurement provides the same information as the first measurement—namely signal strength in the x, y, and z planes and the absolute location of the antenna 34 as received by the GPS receiver 32.

The processor 38 may then compare the values of the second measurement to the first measurement. The processor 38 further knows the absolute locations of the first and second measurement, and the vector distance between the locations at which each measurement was taken. Critical to the method are the relative signal strengths of the two measurements and the movement of the tracker 10 toward or away from the drilling machine 20 when moving to the second location. This comparison allows the processor 38 to determine the shape of the field, the origin of the field at the beacon 12, the location of the null points 22 relative to the tracker 10, and the absolute positions of the beacon 12 and tracker 10.

While two measurements are discussed herein, it should be understood that an operating tracker may take iterative measurements of the magnetic field 21 on an ongoing basis. Such iterations will allow the processor 38 to make refinements to the measured locations of the null points 22 and track the beacon 12 when it is advanced by the drill string 14. The processor 38 may use the two most recent measurements, or may use more than two measurements in determining characteristics of the magnetic field 21.

Calculations solving for the determination of the magnetic field source location are given in U.S. Pat. No. 7,647,987, Cole, which has been previously incorporated by reference, and U.S. Pat. No. 9,547,101, issued to Cole, which is incorporated by reference herein.

In previous solutions, the location of a beacon 12 or a null point 22 could be determined relative to two above-ground locations only when certain variables were known. For example, the field equations given in Cole '101 require that the antennas be within a "transmitter" plane—that is, the frame is maintained in a position where the two measurement points are perpendicular to the axis of a beacon 12. (See Col. 9, ll. 46-49.) Because the GPS receiver 32 makes absolute position available to the processor 38 of the tracker 10 without requiring that the measurements are taken in a particular orientation, such limitations in previous tracking solutions can be overcome.

With reference to FIGS. 6A-6C, the display 60 is shown. The display 60 comprises a level indicator 62, which is a display of the tilt as detected by the orientation sensor 30. Indications of beacon 12 temperature, signal strength, battery level and frequency are given in area 64. Beacon 12 roll position, pitch indicator, and suggested steering corrections are shown in area 65.

In FIG. 6A, a target 66 is in the middle of the display 60. The target 66 represents the approximate location of the closest null 22. A dot 67 represents the location of the tracker 10. In FIG. 6B, the tracker 10 is moved to the null 22 location. As a result, the dot 67 is shown within the target 66.

It should be understood that the magnetic field has two null points 22, one in front of the beacon 12 and one behind. In common single-antenna tracking systems, the null points 22 have indistinguishable characteristics. However, in the current tracker 10, the absolute position of the first location 70 (FIGS. 2A-2C), second location 72 (FIGS. 3A-3C), and drilling machine 20 are known.

When the tracker 10 is in the configuration of FIG. 6A, the tracker 10 needs to be moved forward and to the right so that the dot 67 enters the target 66, as in FIG. 6B. At this point, any further movement will reveal which null point 22 was found. If the operator moves away from the drilling machine 20 and the signal increases, the null found is the rear null 22b. Conversely, if the operator moves the tracker 10 away from the drilling machine 20 and the magnetic field 21 signal decreases, the null point 22 found is the front null 22a. This is because the overall magnetic field 21 signal emanating from the beacon 12 is essentially a normal curve with the maximum signal being located directly above the beacon.

When the location and identification of each null 22 and the beacon 12 is complete, a representation of the tracker location, beacon location, and each null location may be shown on the display 60, as shown in FIG. 6C.

Once the processor 38 determines which null point 22 is at the target 66, a second target 68 is placed at the position of the other null, and a beacon 12 indicator 69 is shown halfway between the targets 66, 68. In FIG. 6C, the target 66 is the rear null 22b and the second target 68 is the front null 22a.

While the simple method described above describes placing the tracker 10 at the null point 22, the magnetic field 21 strength approximates a normal curve for all lines parallel to the orientation of the beacon 12. Therefore, it should be understood that magnetic field measurements, absolute locations, and the location of drilling machine 20 may be used by the processor to identify the null as a front null 22a or rear null 22b. Thus, the second measurement may take place at any location within the magnetic field 21 to determine an estimated beacon 12 position relative to the detected null 22 and the drilling machine 20, allowing the map of FIG. 6C to be generated.

The dot 67 will move around the local map on the display 60 as the tracker 10 moves. The tracker 10 may be placed at the front null 22a as represented by the second target 68 or over the beacon 12 as represented by the indicator 69 as needed for the particular task. At these points, the magnetic field 21 signal can be used to verify the initial location estimates determined by the processor 38. The beacon 12 and GPS signals can also be used to continually correct and adjust the locations of the different points of interest, such as the null points 22. As the drill string 14 advances the bit 16 and beacon 12, its absolute position can be tracked as the magnetic field 21 source moves in the underground environment.

At the front null point 22a, the estimated beacon depth and a predicted depth of the beacon 12 along a projected path may be calculated. Depth may be estimated using known equations for the remaining component of the field—that is—the vertical component thereof as detected by the component 51 of the antenna 34 perpendicular to the vertical direction.

The local map generated at the display 60 can be overlaid on actual map images, such as those available at Google maps, whether through a Bluetooth connection, or loaded from a memory card, etc.

Steering corrections for the drill string 14, mapping the borepath, and parameters of the drilling operation are conducted as in the prior art. Depth of the beacon 12 itself is determined much as in the prior art methods. The modification made here involves the use of GPS positions of measurement locations to find and identify null points 22 of the magnetic field 21.

Changes may be made in the construction, operation and arrangement of the various parts, elements, steps and procedures described herein without departing from the spirit and scope of the invention as described in the following claims. Thus, while the principal preferred construction and modes of operation of the invention have been explained in what is now considered to represent its best embodiments, it should be understood that within the scope of the appended claims, the invention may be practiced otherwise than as specifically illustrated and described.

Phrases in the claims such as "configured to" are not intended to invoke the provisions of 35 U.S.C. § 112(f). When § 112 (f) is invoked herein, it will be due to the explicit use of the words "means for" or "step for".

What is claimed is:

1. A method of observing an underground dipole field source at a first underground location, the underground dipole field source having a magnetic field arranged in a radiation pattern, comprising:
    at a first above ground location, measuring the magnetic field with a receiving antenna;
    obtaining a set of geographical coordinates for the first above-ground location using a global positioning receiver;
    thereafter, moving the receiving antenna and global positioning receiver to a second above-ground location;
    thereafter, measuring the magnetic field at the second above-ground location using the receiving antenna;
    obtaining a set of geographical coordinates for the second above-ground location using the global positioning receiver;
    determining a relative position of the underground dipole field source relative to the first and second locations using the magnetic field measurements at the first and second above-ground location; and
    estimating a global location of the underground dipole field source using two sets of geographical coordinates at the first and second above-ground locations and the relative position of the underground dipole field source.

2. The method of claim 1 further comprising:
    using the field measurement at each of the first and second above-ground locations, determining a relative position of a null location relative to the first and second above-ground locations;
    using the geographical coordinates of each of the first and second-above ground location, determining the absolute position of the null location;
    moving the receiving antenna and global positioning receiver to the null location;
    thereafter, measuring the magnetic field at the null location using the receiving antenna; and
    thereafter, measuring a depth of the underground source using the magnetic field strength measured at the null location.

3. The method of claim 2 further comprising estimating an orientation of the underground dipole field source using the field measurement at each of the first and second locations and an orientation signal from an orientation sensor.

4. The method of claim 2, in which the underground dipole field source is disposed at an end of a drill string extending in a first direction from a drilling machine, and further comprising:
    determining the location of the null field location as a front null point or rear null point using the two magnetic field measurements, the two sets of geographical coordinates, and a position of the drilling machine.

5. The method of claim 2 further comprising:
    moving the receiving antenna and global positioning system to the above ground null field location;
    thereafter, repeating this series of steps:
        measuring the magnetic field using the same receiving antenna;

obtaining a set of geographical coordinates using the same global positioning receiver;

thereafter, re-estimating the null field location using the two most recently-obtained sets of magnetic field measurements and geographical coordinates; and thereafter, moving the receiving antenna and global positioning system to the re-estimated null field location.

6. The method of claim 5 further comprising:

after the step of moving the receiving antenna and global positioning receiver to the re-estimated null location, measuring the magnetic field at the null location using the receiving antenna; and thereafter, estimating the depth of the underground source using the magnetic field strength measured at the null location.

7. The method of claim 1 further comprising:

generating a map of the positional relationships between the magnetic field source, at least one null field location, and the receiving antenna.

8. The method of claim 1, further comprising:

advancing the underground dipole field source to a second underground location, wherein the second underground location is spaced apart from the first underground location;

at a third above-ground location, measuring the magnetic field with the receiving antenna;

obtaining a set of geographical coordinates for the third above-ground location using the global positioning receiver;

determining a relative position of the underground dipole field source relative to the third above-ground location using the magnetic field measurements at the third above-ground location; and estimating a global location of the second location of the underground dipole field source using the geographical coordinates at the third above-ground location and the relative position of the second location of the underground dipole field source.

9. An above-ground tracking system, comprising:

a portable frame;

a triaxial antenna supported by the frame and responsive to a magnetic dipole field;

a global positioning system receiver supported by the frame;

a processor coupled to the antenna and receiver; and a memory coupled to the processor having program instructions stored therein which, when executed by the processor, perform the steps of:

in response to a first and single user request, obtaining a first set of measurements comprising:

a location measurement from the global positioning receiver; and a magnetic field measurement from the receiving antenna; and in response to a second, subsequent, and single user request, obtaining a second set of measurements, comprising:

a location measurement from the global positioning receiver; and a magnetic field measurement from the receiving antenna;

determining a relative position of a below-ground source of the magnetic field using the magnetic field measurements of the first and second set of measurements; and determining an absolute position of the below-ground source of the magnetic field using the location measurement of the first and second sets of measurements and the relative position.

10. The tracking system of claim 9 in which the processor is configured to determine a vector distance between successive measured locations.

11. The tracking system of claim 9 further comprising:

an orientation sensor disposed on the frame;

wherein the processor is configured to receive orientation signals from the orientation sensor.

12. The tracking system of claim 11 in which the orientation sensor comprises a compass.

13. The tracking system of claim 11 which the orientation sensor comprises a tilt sensor.

14. The system of claim 11 in which the processor is supported on the frame.

15. The tracking system of claim 9 wherein the memory has program instructions stored therein which, when executed by the processor, perform the steps of:

determining, using the magnetic field measurements of the first and second sets of measurements, a shape of the magnetic field, such that the processor can determine an above-ground null position at which the field is vertical.

16. A system comprising:

a horizontal directional drill;

a drill string having a first end and a second end, the drill string operatively connected to the horizontal directional drill at the first end;

a downhole tool disposed at the second end of the drill string; and the system of claim 11;

in which the below-ground dipole field source is located at the downhole tool.

17. A method of using the system of claim 16, comprising:

advancing the drill string such that the downhole tool is at a first underground position;

placing the frame at a first above-ground position;

obtaining a first set of measurements of magnetic field and the absolute position at the first above-ground position using the antenna and the global positioning receiver, and storing the first set of measurements in the memory;

thereafter, moving the frame to a second above-ground position;

obtaining a second set of measurements of magnetic field and the absolute position at the second above-ground position using the antenna and the global positioning receiver, and storing the second set of measurements in the memory;

determining a relative position of the below-ground dipole field source relative to the first and second above-ground locations using the magnetic field measurements at the first and second above-ground location; and estimating a global location of the below-ground dipole field source using the absolute position of the first and second above-ground position and the relative position.

18. The method of claim 17 further comprising:

obtaining a measurement of compass orientation and tilt orientation of the frame at the first above-ground position;

storing the compass orientation and the tilt orientation at the first above-ground position with the first set of measurements;

obtaining a measurement of compass orientation and tilt orientation of the frame at the second above-ground position; and storing the compass orientation and the tilt orientation at the second above-ground position with the second set of measurements.

\* \* \* \* \*

UNITED STATES PATENT AND TRADEMARK OFFICE
CERTIFICATE OF CORRECTION

PATENT NO. : 11,397,266 B2
APPLICATION NO. : 16/549740
DATED : July 26, 2022
INVENTOR(S) : Cole et al.

Page 1 of 1

It is certified that error appears in the above-identified patent and that said Letters Patent is hereby corrected as shown below:

In the Specification

Column 1, Line 9, after the word "is" please insert --supported--.

In the Claims

Column 6, Claim 2, Line 7, please delete "second-above ground" and substitute therefor "second above-ground".

Signed and Sealed this
Thirteenth Day of September, 2022

Katherine Kelly Vidal
*Director of the United States Patent and Trademark Office*